United States Patent
Sommese et al.

[11] Patent Number: 5,441,649
[45] Date of Patent: Aug. 15, 1995

[54] VINYLAMINE COPOLYMER FLOCCULANGTS FOR USE IN COAL REFUSE THICKENING

[75] Inventors: Anthony G. Sommese, Naperville; Krishnan J. Pillai, Aurora, both of Ill.

[73] Assignee: Nalco Chemical Company, Naperville, Ill.

[21] Appl. No.: 162,249

[22] Filed: Dec. 6, 1993

[51] Int. Cl.⁶ .............................................. C02F 1/56
[52] U.S. Cl. ........................................ 210/735; 209/5; 210/725; 210/734
[58] Field of Search ................... 209/5; 210/725, 727, 210/728, 734, 735

[56] References Cited

U.S. PATENT DOCUMENTS

| | | | |
|---|---|---|---|
| 3,717,336 | 2/1973 | Nowak et al. | 210/735 |
| 4,217,214 | 8/1980 | Dubin | 210/735 |
| 4,421,602 | 12/1983 | Brunnmueller et al. | 162/168.2 |
| 4,880,497 | 11/1989 | Pfohl et al. | 162/135 |
| 4,921,621 | 5/1990 | Costello et al. | 175/65 |
| 4,952,656 | 8/1990 | Lai et al. | 525/328.2 |
| 5,037,927 | 8/1991 | Itagaki | 526/307.7 |
| 5,126,395 | 6/1992 | End et al. | 524/801 |
| 5,178,774 | 1/1993 | Payne et al. | 210/727 |
| 5,185,083 | 2/1993 | Smigo et al. | 210/735 |

*Primary Examiner*—Peter A. Hruskoci
*Attorney, Agent, or Firm*—James J. Drake; Robert A. Miller

[57] ABSTRACT

The invention provides a method for dewatering coal tailing aqueous slurries. The method including the step of adding to the slurry a flocculant composition including a vinylamine polymer including from about 1 to about 100 mole percent vinylamine and from about 1 to about 99 mole percent of at least one monomer selected from the group consisting of vinylformamide, vinyl acetate, vinyl pyrrolidinone, vinyl alcohol and the esters, amides and salts of acrylic acid and methacrylic acid.

4 Claims, No Drawings

VINYLAMINE COPOLYMER FLOCCULANGTS FOR USE IN COAL REFUSE THICKENING

FIELD OF THE INVENTION

This invention relates generally to the treatment of coal tailings, and, more particularly, to the flocculation of coal flotation tailings in the thickener.

BRIEF DESCRIPTION OF THE PRIOR ART

In the mining of coal, various types of shale and clay are produced along with the coal. To increase the heating value of the coal and to reduce hauling costs, a coal washing process is normally used. In this process, the coal is graded and the coarse sizes, generally greater than a ¼ of an inch in diameter, are then fed through a slurry vat in which the density of the vat media is closely controlled. The coal floats in the heavy media of the vat while heavier rocks sink to the bottom.

The smaller-sized fractions, less than a ¼ inch in diameter, may be processed in spiral concentrators, shaking tables, hydrocyclones. The smallest particles, less than ½ millimeter in diameter, are processed by froth flotation. In each of these steps, more coal is recovered and the refuse is dewatered as well as possible. While spiral concentrations, shaking tables, and hydrocyclones utilize differences in specific gravity, separation based on differences in specific gravity is inefficient for smaller-sized fractions. Thus, in these lower size ranges, differences in the surfaces characteristics between high ash particles and the cleaner low ash particles are relied on in order to separate the particles. This process is called froth flotation.

In the froth flotation process, the fine coal particles are fed to an agitation tank in the form of a slurry having solids levels typically at about 3 to 8 percent but sometimes as high as about 15 to 20 percent. The slurry is conditioned with a class of chemicals called collectors which selectively coat and thereby impart hydrophobicity to the coal particles while leaving the higher ash fractions untouched. A frother is then added and the slurry is conditioned. Air is then bubbled through the mixture. The hydrophobized coal particles stick to the bubbles and rise to the top of the tank in the form of a froth. High ash hydrophilic fractions remain in the slurry and are called tailings. The tailings, which typically constitute about 2 to 4 percent solids are then sent to a thickener to be settled, so that the water in the slurry may be reused in the process to thereby minimize or eliminate effluent flow. It is thus highly desirable to dewater this refuse slurry as efficiently as possible.

In the thickener, coagulants and flocculants are used to help dewater the slurry. Coagulants are added in order to neutralize charges on the particles in the slurry. The charge neutralized particles form pin or micro flocs. One commonly used and generally effective coagulant is polydiallyldimethylammonium chloride ("DADMAC") having a molecular weight of about 100,000 da. Treatment with such coagulants is then followed with treatment with a flocculant.

Flocculants work by gathering together the floc particles in a net, bridging from one surface to the other and binding the individual particles into large agglomerants. Flocculation not only increases the size of the flocced particles, it also affects the physical nature of the floe, so that the slurry will dewater at a faster rate because of the reduction of the gelatinous structure of the floc.

In the flocculation of tailing slurries, typical flocculants include anionic high molecule weight polymers, copolymers of acrylamide and acrylic acid (acrylates), polyacrylamides and polyacrylates having molecular weights from about 1,000,000 to about 20,000,000 da.

The flocs settle to the bottom of the thickener, and, after a short period of time form a compact bed. This bed is discharged as tailings from the bottom of the thickener in the form of a 30 to 40 percent solids slurry. The tailings are either sent to belt presses where they are further dewatered and then disposed of in tailing ponds or sent to tailings ponds.

SUMMARY OF THE INVENTION

The invention provides a method for thickening and dewatering coal tailing aqueous slurries in a thickener, the method including the step of adding to the slurry in the thickener a flocculant composition including a vinylamine polymer including from about 1 to about 100 mole percent vinylamine and from about 1 to about 99 mole percent of at least one monomer selected from the group consisting of vinylformamide, vinyl acetate, vinyl alcohol, vinyl pyrrolidinone and the esters, amides and salts of acrylic acid and methacrylic acid.

DESCRIPTION OF THE PREFERRED EMBODIMENTS

The invention provides a flocculant composition and a method of using the same. The invention provides improved coal tailings flocculation lending to improved and enhanced supernatent water clarity. Unlike the standard treatment in the industry (coagulant plus flocculant), the invention acts as both a flocculant and a coagulant, thus, eliminating the need for a two-component treatment. The invention uses a vinylamine polymer flocculant to accomplish this goal. According to the invention, the polymer contains from about 1 to about 100 mole percent vinylamine monomer and/or a monomer hydrolyzable to vinylamine, and/or from 1–99 mole percent of vinylformamide, vinyl alcohol, vinyl pyrrolidinone, vinyl acetate or the esters, amides and salts of acrylic acid and methacrylic acid. According to one embodiment of the invention, the polymer of the invention is a copolymer of acrylic acid and vinylformamide. In thickener applications, the polymers of the invention may be added before or after the slurry is coagulated with a standard coagulant in the industry. Preferably, however, the flocculants of the invention are added alone without coagulant.

For purposes of this invention, vinylamine monomers includes vinylamine and those monomers which are hydrolyzable to the following formula:

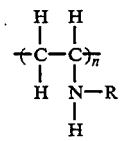

wherein: R is, preferably, one substituent group selected from the group consisting of hydrogen and an alkyl group having from 1–10 carbon atoms. More preferably, R is hydrogen or is an alkyl group having 1–4 carbons.

The vinylformamide monomer of the invention is non-hydrolyzed and has the following structure:

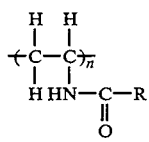

wherein: R is, preferably, one substituent group selected from the group consisting of hydrogen and an alkyl group having from 1-10 carbon atoms. More preferably, R is hydrogen or is an alkyl group having 1-4 carbons.

For purposes of the invention, acrylic acid monomer includes acrylic add and those monomers hydrolyzable to the following formula:

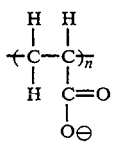

One preferred method of producing the vinylamine/vinyl alcohol containing polymers of the invention is to polymerize vinylformamide and vinyl acetate. Thereafter, the copolymer is hydrolyzed to a vinylamine/vinyl alcohol copolymer.

According to one embodiment of the invention, the flocculants of the invention includes a vinylamine/acrylic acid copolymer. Preferably, the copolymer will include from about 1 to about 99 mole % vinylamine and about 1 to about 99% acrylic acid. More preferably, the copolymer will include from about 2 to about 80 mole % acrylic acid and from about 98 to about 20 mole % vinylamine. Most preferably, the acrylic acid is included in the copolymer in an amount of from about 10 to about 50 mole % and the vinylamine is included in an amount of from about 90 to about 50 mole %.

According to a further embodiment of the invention, the flocculant composition includes vinylamine/vinylformamide copolymer. Preferably, the copolymer includes from about 1 to about 97% vinylamine and from about 1 to about 97% vinylformamide. More preferably, the copolymer includes from about 99 to about 50% vinylamine and from about 1 to about 50% vinylformamide.

The flocculant compositions of the present invention are applied to the coal tailings slurry in the thickener as a dilute aqueous solution. Preferably, the aqueous solution is applied to the coal tailings slurry in a dosage of from about 0.100 to about 100.0 parts per million (ppm) of the polymers of the invention based on the total volume of the slurry. More preferably, the polymers of the invention are added to the slurry in a dosage of from about 1.0 to about 50 parts per million. Most preferably, the polymers of the invention are added to the slurry in a dosage of from about 2.0 to about 20.0 parts per million.

Processes for making the polymers of the invention are well known in the art. U.S. Pat. Nos. 5,126,395, 5,037,927, 4,952,656, 4,921,621, 4,880,497 and 4,421,602 all describe methods for preparing the polymers of the invention. Solution polymerization produces acceptable molecular weights; however, the preferred method of synthesis of high molecular weight polymers is by inverse emulsion polymerization which is described in U.S. Pat. No. 4,952,656. Polyvinylformamide and acrylic acid/vinylformamide polymers are susceptible to alkaline or acid hydrolysis which converts some or all of the amide groups to amine groups. This hydrolysis phenomena is described in U.S. Pat. No. 4,421,602, the disclosure of which is incorporated herein by reference. Thus, by controlling the stoichiometry of the hydrolyzing agent (acid or base), it is possible to produce vinylformamide/vinylamine copolymers or vinylamine/vinylformamide/acrylic acid terpolymers.

The following examples demonstrate that the polymers of the invention are effective flocculants at molecular weights of from about 10,000 to about 10,000,000 daltons (da). More preferably, the polymers of the invention have a molecular weight of from about 200,000 to about 3 million. Most preferably, the polymers have a molecular of about 750,000-2 million.

One problem encountered in the industry is that the flocculants currently being used do not perform well at pHs above 8. Surprisingly, the flocculant polymers of the invention perform well over a wide spectrum of pH. According to one embodiment of the invention, the pH of the slurry being treated by the flocculants of the invention is from about 5 to about 14. More preferably, the pH of the slurry is from about 6 to about 12. Most preferably, the pH of the slurry is from about 7 to about 10. As demonstrated in examples below, at a pH of 10, the invention far outperforms the standard flocculant in the industry.

The following examples are presented to describe preferred embodiments and utilities of the invention and are not meant to limit the invention unless otherwise stated in the claims appended hereto.

EXAMPLE 1

Following is a general description of the procedure used to evaluate the invention. The flocculants of the invention were evaluated using a cylinder settling test. The settling test is a standard test in the industry and is a valuable tool for reliably screening and evaluating flocculants for thickener applications. Results obtained in testing can be directly translated to the plant process. The following procedure outlines the steps used in performing the test.

Five to ten gallons of untreated coal flotation tailing slurry feed was obtained. Using a mixer, the slurry was mixed to uniformly disperse any coarse solids. Five hundred ml of slurry was transferred into a 500 ml graduated cylinder.

The flocculant was prepared as a 1% aqueous solution. The cylinder was inverted four times to thoroughly disperse the solids, then immediately the flocculant was added to the slurry. The cylinder was then inverted four additional times. If a coagulant was also used in the evaluation, the coagulant was added first. The cylinder is inverted four times after each reagent is added. The coagulant used was NALCO® 9853, a standard coagulant in the industry. The flocculants used are identified in Table 1 below. The control was flocculant "A". Flocculant A was NALCO® 9810, a standard flocculant used in this application in the industry.

TABLE 1

| Flocculant (Floc) | Composition | Molecular Weight Range |
| --- | --- | --- |
| A | NALCO ® 9810 | — |
| B | PVA | 1-2 million |
| C | PVA | 800,000-1.5 million |
| D | 70/30 AcAm/VF | 1-8 million |

TABLE 1-continued

| Flocculant (Floc) | Composition | Molecular Weight Range |
|---|---|---|
| E | 70/30 VA/VF | 800,000–1.5 million |
| F | PVF | 1–2 million |
| G | 70/30 VA/VF | 1–2 million |
| H | 90/10 VF/vinyl acetate | 100,000–300,000 |
| I | 90/10 VA/vinyl alcohol | 100,000–300,000 |
| J | PVA | 10,000–20,000 |
| K | PVA | 30,000–50,000 |
| L | PVA | 200,000–500,000 |

PVA — Polyvinylamine
AcAm — Acrylamide
VF — Vinylformamide
VA — Vinylamine
PVF — Polyvinylformamide After the last reagent was added, the cylinder was placed at rest and the rate at which the flocculated particles settled was monitored by marking the position of the solid/liquid interface at different time intervals. The settling rate which was recorded as inches per minute, is an indication of the efficacy of the treatment. The clarity of the supernatent water was also determined and recorded in nephalometric turbidity units (NTU). The results are summarized in Tables 2, 3 and 4 below.

Referring to Table 2, Table 2 summarizes the effectiveness of PVA polymers of different molecular weights. The data from this trial demonstrates that the polymers of the invention are useful to improve settling without the use of a coagulant. Table 2 also demonstrates that the polymers of the invention are effective at molecular weights of 10,000 to at least 2,000,000.

TABLE 2

| # | Flocculant | Dose (ppm) Floc | Settling Rate (in/min) | Clarity (NTU) |
|---|---|---|---|---|
| 1 | J | 5 | 0.20 | 30.0 |
| 2 | K | 5 | 4.00 | 22.0 |
| 3 | L | 5 | 6.25 | 18.0 |
| 4 | C | 5 | 6.30 | 3.0 |
| 5 | A | 5 | 6.50 | 12.0 |
| 6 | J | 10 | 2.50 | 46.0 |
| 7 | K | 10 | 6.00 | 19.0 |
| 9 | L | 10 | 7.00 | 10.0 |
| 9 | C | 10 | 8.00 | 10.0 |
| 10 | B | 10 | 7.50 | 12.0 |

Referring to Table 3, Table 3 demonstrates the effectiveness of the invention at various dosages versus the standard flocculant in the industry. Table 3 b 54416110.001 demonstrates that the polymers of the invention are effective without a coagulant. At the dosages tested, the invention performed significantly better than the standard flocculant in the industry. In fact, in some cases, the settling rate was improved by a factor of from about 10 to 55 and clarity was improved by a factor of about 100. This is a significant improvement in the art.

TABLE 3

| # | Flocculant | Dose (ppm) Floc | Settling Rate (in/min) | Clarity (NTU) |
|---|---|---|---|---|
| 1 | D | 10 | 3.75 | 5.00 |
| 2 | F | 10 | 0.50 | 4.0 |
| 3 | G | 10 | 2.75 | 1.00 |
| 4 | E | 10 | 3.10 | 1.0 |
| 5 | H | 10 | 0.50 | 4.0 |
| 6 | I | 10 | 1.50 | 1.00 |
| 7 | A | 10 | 0.50 | 130.00 |
| 8 | B | 10 | 2.50 | 1.0 |
| 9 | D | 20 | 5.50 | 2.0 |
| 10 | F | 20 | 0.50 | 3.0 |
| 11 | G | 20 | 3.60 | 2.00 |
| 12 | E | 20 | 3.60 | 1.0 |
| 13 | H | 20 | 0.50 | 6.00 |
| 14 | I | 20 | 3.00 | 1.0 |
| 15 | A | 20 | 0.10 | 87.00 |
| 16 | B | 20 | 3.20 | 1.0 |
| 17 | D | 30 | 5.00 | 5.00 |
| 18 | F | 30 | 0.40 | 3.0 |
| 19 | G | 30 | 1.25 | 1.0 |
| 20 | E | 30 | 1.60 | 1.00 |
| 21 | H | 30 | 0.50 | 4.00 |
| 22 | I | 30 | 1.00 | 5.00 |
| 23 | A | 30 | 0.50 | 86.00 |
| 24 | B | 30 | 1.75 | 1.0 |

Referring to Table 4, Table 4 summarizes the data collected in trials where the polymers of the invention were trialed at different pHs. The data shows that at various pH values, the invention outperformed the standard flocculant in the industry alone or the standard flocculant in the industry in combination with a standard coagulant. This data demonstrates that the invention functions very well at a pH of at least 6 to about 10.

TABLE 4

| # | Flocculant | Coagulant | Sequence | pH | Dose (ppm) FLOC | Dose (ppm) CAT | Settling Rate (in/min) | Clarity (NTU) |
|---|---|---|---|---|---|---|---|---|
| 1 | C | — | FLOC | 6.55 | 20 | 0 | 1.25 | 1.0 |
| 2 | B | — | FLOC | 6.55 | 20 | 0 | 1.25 | 1.0 |
| 3 | D | — | FLOC | 6.55 | 20 | 0 | 6.42 | 4.0 |
| 4 | E | — | FLOC | 6.55 | 20 | 0 | 1.25 | 1.0 |
| 5 | A | NALCO 9853 | CAT/FLOC | 6.55 | 10 | 10 | 4.00 | 14.0 |
| 6 | A | — | FLOC | 6.55 | 20 | 0 | 2.50 | 20.0 |
| 7 | C | — | FLOC | 8.50 | 20 | 0 | 3.00 | 1.0 |
| 8 | B | — | FLOC | 8.50 | 20 | 0 | 2.40 | 1.0 |
| 9 | D | — | FLOC | 8.50 | 20 | 0 | 6.25 | 6.0 |
| 10 | E | — | FLOC | 8.50 | 20 | 0 | 3.50 | 2 |
| 11 | A | NALCO 9853 | CAT/FLOC | 8.50 | 10 | 10 | 3.50 | 4.0 |
| 12 | A | — | FLOC | 8.50 | 20 | 0 | — | — |
| 13 | C | — | FLOC | 10.00 | 20 | 0 | 2.75 | 5.0 |
| 14 | B | — | FLOC | 10.00 | 20 | 0 | 2.50 | 1.0 |
| 15 | D | — | FLOC | 10.00 | 20 | 0 | 6.90 | 10 |
| 16 | E | — | FLOC | 10.00 | 20 | 0 | 2.80 | 3.0 |
| 17 | A | NALCO 9853 | CAT/FLOC | 10,00 | 10 | 10 | 1.25 | 12 |
| 18 | A | — | FLOC | 10.00 | 20 | 0 | 0.25 | 80 |

Changes can be made in the composition, operation and arrangement of the method of the present invention described herein without departing from the concept and scope of the invention as defined in the following claims:

We claim:

1. A method for thickening and dewatering coal tailing aqueous slurries in a thickener, the method including the steps of:

adding to the slurry in a thickener a coal tailing thickening amount of a flocculant composition including a vinylamine polymer having from about 50 to about 99 mole percent vinylamine and from about 1 to about 50 mole percent of vinylformamide, and a molecular weight of at least about 750,000 daltons;

thickening the coal tailing aqueous slurry; and dewatering the coal tailings.

2. The method of claim 1 wherein the polymer is added to the slurry in a concentration of from about 0.1 to about 100 parts per million.

3. The method of claim 1 wherein the polymer has a molecular weight of from about 1 million to about 10 million.

4. The method of claim 3 wherein the polymer is added to the slurry in a concentration of from about 1 to about 50 parts per million.

* * * * *